Figure 1:
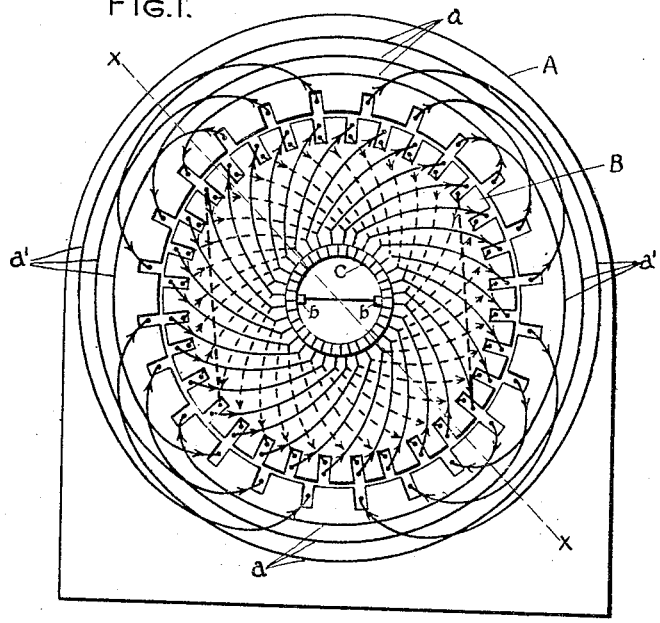

E. F. W. ALEXANDERSON.
ALTERNATING CURRENT MOTOR.
APPLICATION FILED MAY 1, 1907.

923,753.

Patented June 1, 1909.

Witnesses
Irving E. Steers.
J. Ellis Glenn.

Inventor
Ernst F. W. Alexanderson
by Albert G. Davis
Atty.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

No. 923,753.    Specification of Letters Patent.    Patented June 1, 1909.

Application filed May 1, 1907. Serial No. 371,320.

*To all whom it may concern:*

Be it known that I, ERNST F. W. ALEXANDERSON, a citizen of the United States, residing at Schenectady, county of Schenectady, State of New York, have invented certain new and useful Improvements in Alternating-Current Motors, of which the following is a specification.

My invention relates to alternating-current motors of the repulsion type, in which the armature is short-circuited on a line displaced from the line of primary magnetization, and its object is to improve the operation of such motors, both in power-factor and commutation.

The repulsion motor, as ordinarily arranged, is subject to certain disadvantages as compared with the compensated series motor. In the repulsion motor the secondary current is produced by induction from the primary, as in a transformer, but owing to the displacement of the lines of magnetization of the primary and secondary windings, conditions exist in the ordinary repulsion motor like those in a transformer in which the primary and secondary coils are displaced from each other on the core. Such an arrangement, as is well known in the transformer art, produces leakage fluxes and these leakage fluxes in the repulsion motor lower the power-factor. Because of the position of the brushes relative to the primary magnetization, in the ordinary repulsion motor the two conductors or sets of conductors which form the coil undergoing commutation are cutting fields produced by the stator winding, which are of opposite polarity, so that the electromotive forces induced in the coil, due to this cutting, are in series. This produces short-circuited currents, which have a disturbing effect on commutation. Furthermore, a field is produced due to the rotor currents induced by rotation, which field is peaked in form and the coil undergoing commutation is passing through the peak of this field. While below synchronism the electromotive force due to cutting this field is useful as opposing the electromotive force due to transformer action, the effect becomes excessive above synchronism, and for this reason it is exceedingly difficult to secure satisfactory commutation in a repulsion motor at speeds much above synchronism.

My invention consists in a novel arrangement of the motor, such that the above-mentioned defects are eliminated. I accomplish this by providing the motor with a fractional pitch rotor winding and so arranging the rotor brushes as to short-circuit the rotor winding on a line displaced from the line of primary magnetization by an angle, the complement of which bears to ninety electrical degrees a ratio approximately equal to the pitch of the rotor winding. This statement may be explained as follows. It is well understood in the art that not all the conductors of a fractional pitch winding are magnetically effective, since in some of the slots the currents in the conductors are in opposite directions and neutralize each other. It is further well understood that the proportion of conductors that are effective is equal to the pitch; *i. e.*, if the pitch is 75%, then 75% of the conductors are magnetically effective. Now, as will be hereinafter pointed out, it is desired that the magneto-motive forces of armature and inducing windings be similarly distributed. To get this result the proportion of effective armature conductors, or, in other words, the fractional pitch, should be equal to the proportion of the stator over which the inducing winding is distributed. This can further be expressed in terms of the angle between the line of the rotor short-circuit and the line of stator magnetization. The line of the rotor short-circuit should coincide with the line of magnetization of the inducing winding. The displacement therefrom of the line of stator magnetization is produced by the exciting winding and is proportional to the amount of the stator over which the exciting winding is distributed. In other words, and since the portion of the stator covered by the exciting winding is that not covered by the inducing winding, the angle of said displacement bears to 90 electrical degrees a ratio equal to the proportion of the stator not covered by the inducing winding, and the complement of said angle bears to 90 electrical degrees a ratio equal to the proportion of the stator covered by the inducing winding. But since that proportion is equal to the fractional pitch, we reach the statement with which we started, that the angle between the lines of rotor short-circuit and stator magnetization is such that its complement bears to 90 electrical degrees a ratio equal to the pitch of the rotor winding. That is, if half-pitch is selected for the rotor winding, the displacement between the rotor short-circuit and the line of primary magnetization should be approximately forty-five degrees, since the complement of this angle, which is forty-five degrees, bears to ninety degrees the ratio of one-half. Similarly, if a two-thirds pitch is selected for the rotor winding, the displacement between the line of primary and secondary magnetization should be thirty degrees, since the complement of this angle, sixty degrees, is two-thirds of ninety degrees. This arrangement results, first, in producing a perfect neutralization of the primary and secondary magnetomotive forces involved in the induction of the rotor currents, thereby securing the same conditions as in a transformer in which the primary and secondary windings are exactly superposed; second, the opposite sides of a rotor coil undergoing commutation lie opposite the same pole of the stator so that the electromotive forces due to rotation in the stator field tend to neutralize; and third, the field due to the rotor magneto-motive force is flat-topped, instead of peaked, so that the speed can be carried much higher before the commutation limit is reached.

My invention will best be understood by reference to the accompanying drawings, in which—

Figure 3:
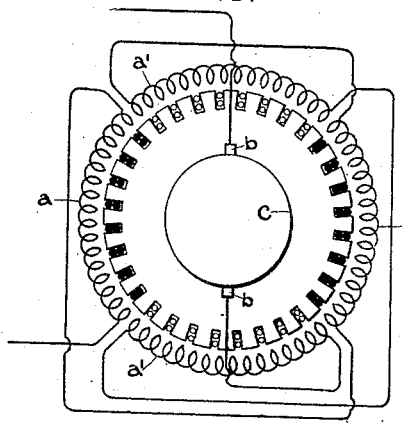
Figure 2:
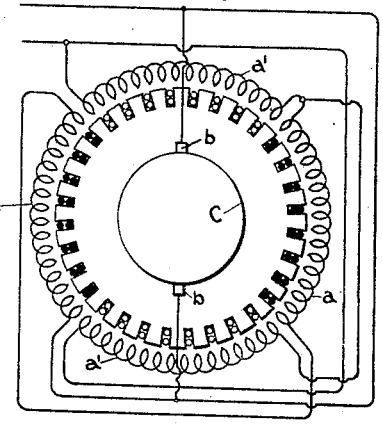
Figure 5:
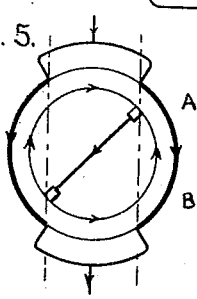
Figure 6:
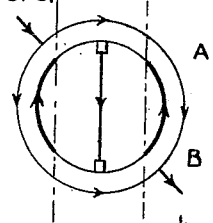

Figure 1 shows diagrammatically a repulsion motor with its windings arranged in accordance with my invention; Fig. 2 shows diagrammatically the connection of the motor winding; Fig. 3 shows the motor connected for operation as a series motor; and Figs. 4, 5 and 6 are explanatory diagrams.

In Fig. 1, A represents the stator and B the rotor, which is provided with a commutator C and short-circuiting brushes $b\ b$. I have selected a bipolar motor for purposes of illustration and have shown each rotor coil with span of approximately 90 degrees, which in a bipolar motor is half-pitch. The magnetic material of the stator is uniformly distributed around the rotor, and carries a winding which comprises two groups of coils, one of which, $a\ a$, is distributed over portions of the stator winding corresponding to the pitch of the rotor winding,—that is, over arcs of ninety degrees. The other group of coils $a'\ a'$ is distributed over the remaining portions which, since the pitch selected for the rotor winding is one-half, are also arcs of ninety degrees. The coils $a\ a$, which serve to induce the current in the rotor, as will hereafter be explained, produce a field which is vertical as viewed in Fig. 1, while the coils $a'\ a'$ produce the cross-magnetization or torque-producing field, which is horizontal as viewed in Fig. 1. Instantaneous directions of current in the several coils of the stator are indicated by arrow-heads. It will be seen that the direction of the line of magnetization produced by the stator currents is as indicated by the dotted line $x\ x$. The purpose of dividing the stator winding into two groups is, first, to facilitate reversal of the motor by reversing the relative connections of the two groups, and second, to permit the operation of the motor as a series motor on either direct or alternating-current. With current flowing at any instant in the stator coils $a$ in the directions indicated by the arrow-heads, the directions of currents in the rotor conductors will be as indicated by the arrow-heads, as may be seen by tracing a circuit through the rotor winding from one brush $b$ to the other. It will be seen from the arrow-heads that, while the currents in the two conductors in each slot adjacent that portion of the stator covered by the coils $a$ are in the same direction, and consequently are effective in producing a magnetization, the currents in the two conductors in each of the other slots are in opposite directions, and consequently neutralize each other, as far as any magnetizing effect is concerned. By the fractional pitch arrangement of the rotor winding itself these latter conductors are rendered as ineffective with respect to the rotor magneto-motive force as though a portion of the rotor winding were cut out of circuit by the use of a plurality of sets of short-circuiting brushes. This current distribution is shown diagrammatically in Fig. 2, in which the rotor conductors, which are effective in producing magnetization, are shown as black circles, while the conductors, each of which has its magnetic effect neutralized by the other conductor or conductors in the same slot, are shown as white circles. Fig. 2 shows that the direction of the rotor magnetization is vertical and the rotor brushes $b\ b$ are placed in this diagram on a vertical line to indicate this. This also represents the position they would in reality occupy with a Gramme ring armature. The difference in the brush positions in Figs. 1 and 2 is due to the fact that in Fig. 1 the brushes are shown in the position they would in reality occupy with a drum-wound armature, due to the fact that the connections from the commutator segments to the coils are made at the center of the end connections of the coils, so that while in Fig. 1, as in Fig. 2, the brushes $b\ b$ are, as far as the electrical operation is concerned, short-circuiting the motor on a vertical line, they actually lie on a horizontal line. It will be understood that hereinafter, when I speak of the position of the brushes, I mean the effective electrical position, as indicated diagrammatically in Fig. 2, and not the physical position, which depends on the arrangement of the coils, and which is immaterial in operation.

It will be seen, from an inspection of Figs. 1 and 2, that not only is the line of magnetization of the rotor vertical, like that produced by the stator coils $a\ a$, but that the portions of the rotor periphery, which are covered by conductors which are effective in producing a magnetization, correspond exactly with the portions of the stator which are covered by the coils a a. Consequently, the conditions in a motor thus arranged are the same as in a transformer, where the primary and secondary windings are exactly superposed, so that leakage fluxes are avoided, and a high power-factor secured. In other words the armature reaction is exactly compensated. It will further be noted that the torque-producing field, or, in other words, the cross-magnetization at right-angles to the rotor short-circuit, is produced entirely by the stator winding $a'$ $a'$, and that the rotor currents do not contribute at all to this cross-magnetization.

Figure 4:
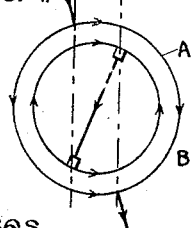

Fig. 4 shows diagrammatically the current distributions in the ordinary repulsion motor having a distributed winding on the stator extending over the entire periphery, and the usual full-pitch rotor winding. The relative directions of current in the stator A and in the rotor B are shown by arrow-heads. It will be seen that the portions of both stator and rotor, which lie between the dotted lines, assist in producing the cross-magnetization, and that the field due to the magneto-motive force of the rotor is peaked and is not completely neutralized by the stator. Fig. 5 shows a diagram of a modified form of repulsion motor, in which the stator winding is distributed over only a portion of the stator A, as indicated by the shading. The heavy lines represent the portions of the stator which are wound; the light portions being supposed to be unwound. The rotor B is supposed to be the usual type with full-pitch winding. In this motor the cross-magnetization is produced by the rotor alone; that portion of the rotor winding between the two dotted lines being effective for this purpose. In this motor also the field due to the rotor magneto-motive force is peaked and is not completely neutralized by the stator. Fig. 6 shows a similar diagram of a repulsion motor arranged in accordance with my invention. The portion of the rotor winding, which is effective in producing magnetization, is shown in heavy lines, and lines outside of the dotted lines. The stator winding is distributed over all the stator. In this motor, as in the compensated series motor, the cross-magnetization is produced wholly by the stator winding, the field due to the rotor magneto-motive force is flat-topped and is wholly neutralized by the stator, as is clearly shown by Fig. 2.

Returning to Fig. 1, it will be seen that the conductors composing a coil undergoing commutation both lie opposite the same pole of the field produced by the stator coils $a'_1$ This field may be considered as extending approximately forty-five degrees on each side of a horizontal line passing through the axis of the machine. The two conductors forming a coil undergoing commutation lie under the two tips of the same pole of this field, so that the electromotive forces induced in these conductors by cutting this field are opposed in the coil, and consequently the disturbing effect on commutation of cutting this field is eliminated. The back connections of the coils undergoing commutation are shown in dotted lines in Fig. 1, the back connections of the other coils being omitted in order to avoid confusion in the diagram.

It has been seen, by comparing Figs. 4 and 6, that in the ordinary repulsion motor represented by Fig. 4, in which all the rotor conductors are effective in producing the rotor magnetization or armature reaction, the shape of the field produced by the rotor currents induced by rotation is peaked, and the point of the peak is at the brushes, while in Fig. 6, on the other hand, since only the portion of the rotor indicated by heavy lines is effective in producing magnetization, the armature magneto-motive force produces a field that is flat-topped in shape. Consequently, the electromotive force induced in a coil short-circuited by the brushes by cutting the rotor field produced by the rotor currents due to rotation is much less in Fig. 6 than in Fig. 4. In any repulsion motor, the electromotive forces induced in a coil short-circuited by the brush are due to two factors; first, the electro-motive force induced by transformer action, and second the electro-motive force due to cutting the field in which the coil conductors lie at that instant. At synchronism these two electro-motive forces are equal and opposite, so that commutation is excellent. Above synchronism the electromotive force due to cutting the field increases, and since in the ordinary arrangement commutation takes place in a peaked field, as above explained, the electro-motive force due to cutting this field increases rapidly, so that the commutation becomes very poor as the speed of the motor is increased. With the flat-topped field produced by my invention, the speed may be increased much further before the limit of commutation is reached. The flat-topped field produced by my invention has a still further advantage in respect to commutation. In any repulsion motor the inducing stator ampere turns are slightly in excess of the induced rotor ampere turns, since it is this excess which produces the inducing or transformer field in the motor. The electro-motive force induced in the coil undergoing commutation by cutting this field is approximately ninety degrees out of phase with the electro-motive force induced through transformer action by the cross-magnetization or torque-producing field, and consequently has not been considered in the above discussion. The electromotive force of commutation reactance, however, is also ninety degrees out of phase with the electro-motive force induced by transformer action in the short-circuited coil, and consequently, if the electromotive force produced by cutting the excess inducing field above mentioned is in the right direction, it assists in commutation. In the ordinary repulsion motor, however, as shown in Fig. 4, although the inducing stator ampere turns are in excess of the induced rotor ampere turns, nevertheless, because of the difference in distribution of these two magneto-motive forces, and because the rotor magneto-motive force is greatest at the brushes, the direction of the field at the brushes is that of the rotor magneto-motive force, and this is in precisely the wrong direction to produce in the coil short-circuited by the brush an electro-motive force opposing the commutation reactance. In a motor arranged in accordance with my invention, on the other hand, the field produced by the stator inducing coils a a is precisely the same in shape as the field produced by the rotor induced ampere turns. Consequently the slight excess of the stator ampere turns produces a field cut by the conductors of the coil undergoing commutation which has the direction of the stator magneto-motive force. The electro-motive force induced in the short-circuited coil by cutting this field is consequently in the proper direction for neutralizing commutation reactance.

As has been set forth, the purpose of dividing the stator winding into two groups is both to facilitate reversal of the motor, and also to render it possible to operate the motor as a series motor on either direct or alternating-current. Fig. 3 shows the motor connected as a series motor for direct-current operation. The rotor brushes, instead of being short-circuited, are connected in series with the stator windings. Furthermore, the cross-magnetizing or torque-producing coils a', which in Fig. 2 I have shown connected in parallel, are shown in Fig. 3 connected in series, so as to produce a relatively stronger cross-field. The reason for this change of connections, is fully set forth in my former application, Serial No. 354,259, filed January 26, 1907, and, briefly stated, is that a stronger cross-magnetization is required for satisfactory operation in a direct-current series motor than is desirable in the same motor operated on alternating-current, whether as series or repulsion motor. It will be seen from Fig. 3 that owing to the identity in the distributions of the magneto-motive forces of the rotor and of the winding a a, which, with the series connection, serves as a compensating winding, perfect compensation for armature reaction is secured.

It will be understood that I have illustrated my invention diagrammatically, and that in practice any well known forms of motor construction and windings may be employed.

I do not desire to limit myself to the particular construction and arrangement of parts here shown, but aim in the appended claims to cover all modifications which are within the scope of my invention.

What I claim as new and desire to secure by Letters Patent of the United States, is,—

1. In a dynamo-electric machine, a stator winding, a fractional pitch rotor winding provided with a commutator, and brushes and connections arranged to short-circuit the rotor winding on a line displaced from the line of primary magnetization by an angle the complement of which bears to ninety electrical degrees a ratio approximately equal to the pitch of the rotor winding.

2. In a dynamo-electric machine, a distributed stator winding, a fractional pitch rotor winding provided with a commutator, and brushes and connections arranged to short-circuit the rotor winding on a line displaced from the line of primary magnetization by an angle the complement of which bears to ninety electrical degrees a ratio approximately equal to the pitch of the rotor winding.

3. In a dynamo-electric machine, a fractional pitch rotor winding provided with a commutator, a stator winding comprising two groups of coils, one distributed over portions of the stator corresponding approximately to the pitch of the rotor winding and the other distributed over the remaining portions, and commutator brushes and connections arranged to short-circuit the rotor on a line parallel to the line of magnetization produced by the first mentioned group of stator coils.

4. In a dynamo-electric machine, a fractional pitch rotor winding provided with a commutator, a stator winding comprising two groups of coils, one distributed over portions of the stator corresponding approximately to the pitch of the rotor winding and the other distributed over the remaining portions, and commutator brushes and short-circuiting connections arranged symmetrically with respect to both groups of stator coils.

5. In a dynamo-electric machine, a fractional pitch rotor winding, a stator having its magnetic material distributed uniformly around the rotor, a stator winding comprising two groups of coils, one distributed over portions of the stator corresponding approximately to the pitch of the rotor winding and the other distributed over the remaining portions, and commutator brushes arranged symmetrically with respect to both groups of stator coils.

6. An alternating-current repulsion motor, comprising an armature provided with a commutator and a fractional pitch winding, brushes and connections short-circuiting the armature on a definite line, a stator, stator coils in inductive relation to the armature short-circuit distributed over portions only of the stator corresponding to the pitch of the armature coils, and cross-magnetizing coils occupying the portions of the stator not occupied by the other stator coils.

7. In a repulsion motor, a rotor winding provided with a commutator, a single set of commutator brushes and connections short-circuiting the winding on a definite line, the winding having a fractional pitch whereby a portion of its conductors are at any instant magnetically ineffective, and a stator winding having two groups of coils, one distributed over portions of the stator corresponding approximately to the portions of the rotor the conductors of which are magnetically effective, and the other occupying the remaining portions of the stator.

8. In a repulsion motor, a rotor winding provided with a commutator, a single set of commutator brushes and connections short-circuiting the winding on a definite line, the winding having a fractional pitch whereby a portion of its conductors are at any instant magnetically ineffective, and a stator winding having its line of magnetization displaced from the line of the rotor short-circuit by an angle corresponding approximately to one-half the arc covered by a group of magnetically ineffective conductors on the rotor.

9. In a repulsion motor, a rotor winding provided with a commutator, a single set of commutator brushes and connections short-circuiting the winding on a definite line, the winding having a fractional pitch whereby a portion of its conductors are at any instant magnetically ineffective, and a stator winding comprising coils arranged to produce in conjunction with the rotor winding a flat-topped field in the direction of the line of the rotor short-circuit and other coils arranged to produce a cross-field.

10. In a repulsion motor, a fractional pitch rotor winding provided with commutator, brushes, and connections short-circuiting the winding on a definite line, and a stator winding comprising coils arranged to produce in conjunction with the rotor winding a flat-topped field in the direction of the line of the rotor short-circuit and other coils arranged to produce a cross-field.

In witness whereof, I have hereunto set my hand this 30th day of April, 1907.

ERNST F. W. ALEXANDERSON.

Witnesses:
 BENJAMIN B. HULL,
 HELEN ORFORD.